United States Patent
Gruber et al.

(10) Patent No.: US 11,790,123 B2
(45) Date of Patent: Oct. 17, 2023

(54) COMPUTER-IMPLEMENTED METHOD FOR THE SEMI-AUTOMATED CREATION OF A DIGITAL DESIGN PLAN OF AN ELECTRICAL SWITCHGEAR SYSTEM

(71) Applicant: EPLAN GMBH & CO. KG, Monheim Am Rhein (DE)

(72) Inventors: Thiemo Gruber, Ratingen (DE); Vincent Layes, Gelsenkirchen (DE); Alexander Peters, Langenfeld (DE)

(73) Assignee: EPLAN GMBH & CO. KG

( * ) Notice: Subject to any disclaimer, the term of this patent is extended or adjusted under 35 U.S.C. 154(b) by 0 days.

(21) Appl. No.: 17/920,488

(22) PCT Filed: Feb. 17, 2021

(86) PCT No.: PCT/DE2021/100155
§ 371 (c)(1),
(2) Date: Oct. 21, 2022

(87) PCT Pub. No.: WO2021/213567
PCT Pub. Date: Oct. 28, 2021

(65) Prior Publication Data
US 2023/0143649 A1 May 11, 2023

(30) Foreign Application Priority Data
Apr. 24, 2020 (DE) ............... 10 2020 111 291.2

(51) Int. Cl.
*G06F 3/048* (2013.01)
*G06F 30/12* (2020.01)
*G06F 3/0484* (2022.01)

(52) U.S. Cl.
CPC ............ *G06F 30/12* (2020.01); *G06F 3/0484* (2013.01)

(58) Field of Classification Search
CPC .................. G06F 30/12; G06F 3/048
See application file for complete search history.

(56) References Cited

U.S. PATENT DOCUMENTS

2013/0212513 A1* 8/2013 Loberg .................... G06F 30/18
715/771
2014/0282178 A1 9/2014 Borzello
(Continued)

FOREIGN PATENT DOCUMENTS

WO WO-0173615 A1 10/2001
WO WO-2020149839 A1 7/2020

OTHER PUBLICATIONS

Jomes et al., Computer Graphics Production of Switchgear Engineering Drawing, 1982, IEEE, 9 pages.*
(Continued)

*Primary Examiner* — Linh K Pham
(74) *Attorney, Agent, or Firm* — Harness, Dickey & Pierce, P.L.C.

(57) ABSTRACT

A computer-implemented method for the semi-automated generation of a digital design plan of an electrical switchgear, comprising:
monitoring a user interaction with a system for the computer-aided creation of a digital design plan of an electrical switchgear, directed towards the creation of a digital design plan of an electrical switchgear, wherein at least one last user interaction with the system is recognized and stored in a memory of the system as user interaction data.

14 Claims, 1 Drawing Sheet

(56) References Cited

U.S. PATENT DOCUMENTS

| | | | |
|---|---|---|---|
| 2020/0159870 A1* | 5/2020 | Bowen | G06F 3/0482 |
| 2020/0387646 A1* | 12/2020 | Arancibia | G06F 30/12 |
| 2022/0075917 A1* | 3/2022 | More | G06F 9/453 |
| 2023/0143649 A1* | 5/2023 | Gruber | G06F 9/453 |
| | | | 715/771 |

OTHER PUBLICATIONS

International Search Report (English and German) and Written Opinion of the ISA (German) issued in PCT/DE2021/100155, dated May 17, 2021; ISA/EP.

German International Preliminary Report on Patentability issued in PCT/DE2021/100155, dated Jul. 8, 2022.

Mings, Josh, "Adaptive UI for Siemens NX Just Changed the Future of 3D Design Software" Feb. 20, 2019 (Feb. 20, 2019), Retrieved from the Internet: https://www.solidsmack.com/cad/adaptive-ui-for-siemens-nx-just-changed-the-future-of-3d-design-software [retrieved on May 6, 2021] XP055801984.

Siemens Software, "Adaptive Ul in Siemens NX" YouTube, Feb. 18, 2019 (Feb. 18, 2019), p. 1, Retrieved from the Internet: https://www.youtube.com/watch?v=SN17ExY-8Ek&t=128s [retrieved on May 6, 2021] XP054981774.

Wyatt, David F. et al., "A Computational Method to Support Product Architecture Design", vol. 4: Design and Manufacturing, Jan. 1, 2009 (Jan. 1, 2009), pp. 195-208, Retrieved from the Internet: <http://asmedigitalcollection.asme.org/IMECE/proceedings-pdf/doi/10.1115/IMECE2009-11138/2750956/195_1.pdf DOI: 10.1115/IMECE2009-11138, XP055801991.

Nguyen, Kevin J et al., "Compatible Item Recommendation An Undergraduate Research Scholars Thesis", 23 Mai 2018 (May 23, 2018), XP055832630, URL:https://oaktrust.library.tamu.edu/bitstream/handle/1969.1/166481/WEI-FINALTHESIS-2019.pdf.

Anonymous and Others: "Nx electrical and mechanical routing", Jan. 1, 2012 (Jan. 1, 2012), XP055930132, URL:https://oneplm.com/wp-content/uploads/NX_Electrical_Mechanical_Routing.pdf.

* cited by examiner

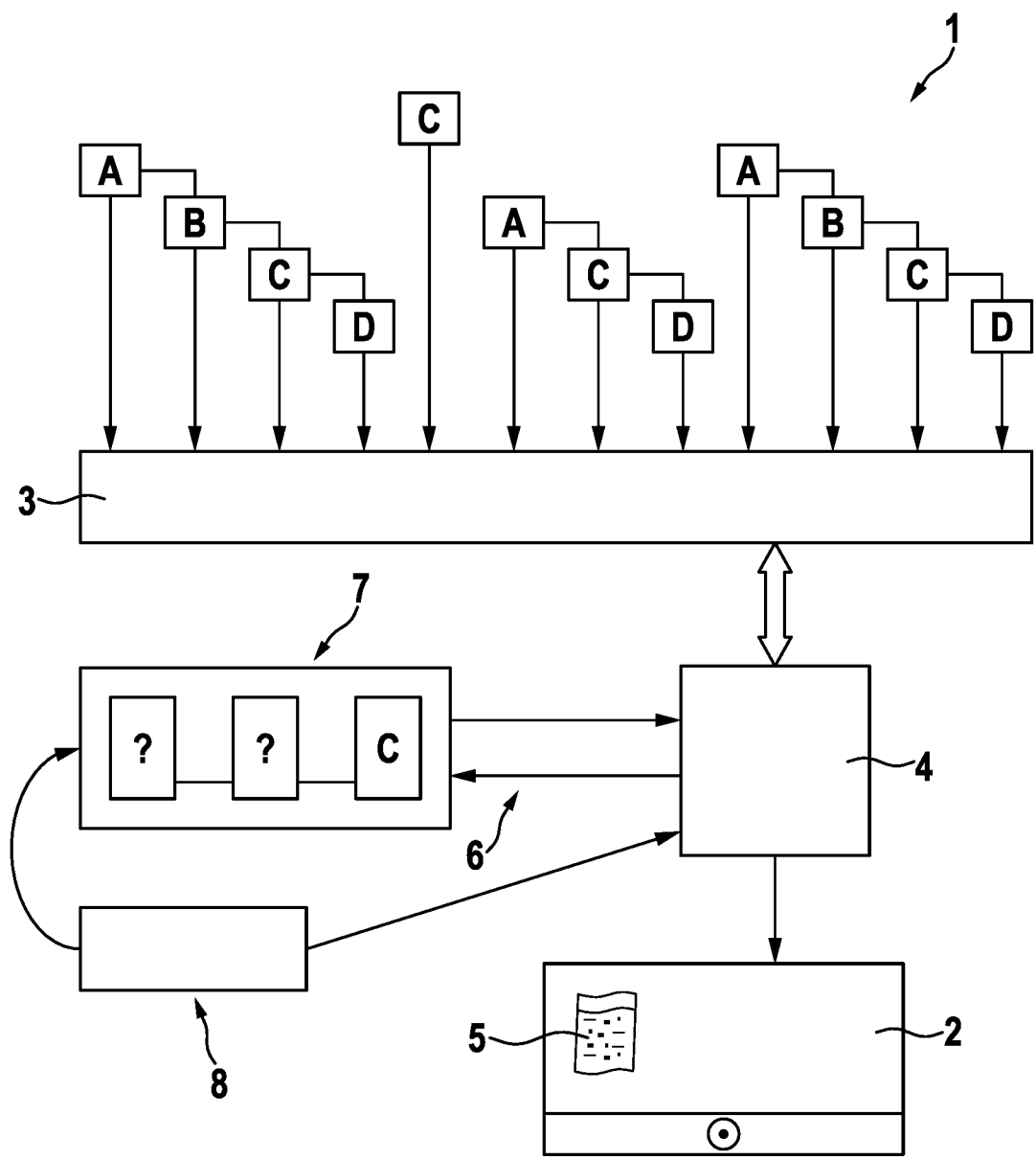

COMPUTER-IMPLEMENTED METHOD FOR THE SEMI-AUTOMATED CREATION OF A DIGITAL DESIGN PLAN OF AN ELECTRICAL SWITCHGEAR SYSTEM

CROSS-REFERENCE TO RELATED APPLICATIONS

This application is a U.S. National Phase Application under 35 U.S.C. 371 of International Application No. PCT/DE2021/100155, filed on Feb. 17, 2021, which claims the benefit of German Patent Application No. 10 2020 111 291.2, filed on Apr. 24, 2020. The entire disclosures of the above applications are incorporated herein by reference.

BACKGROUND

This section provides background information related to the present disclosure which is not necessarily prior art.

Technical Field

The invention relates to a computer-implemented method for the semi-automated generation of a digital design plan of an electrical switchgear.

Discussion

According to the state of the art, digital electromechanical design plans, which can have both an electrotechnical circuit diagram and mechanical and air-conditioning design data, are created using ECAD or MCAD software tools. The existing problem with computer-aided creation of a digital design plan of an electrical switchgear is that a user must select a desired next step from a large number of possible next steps via a visual interface, such as a GUI. Due to the large number of possible actions and contents, the user has to select from extensive lists and menus.

SUMMARY

This section provides a general summary of the disclosure, and is not a comprehensive disclosure of its full scope or all of its features.

It is therefore one aspect of the invention to further develop the method described at the beginning in such a way that it facilitates the creation of digital design plans of electrical switchgear.

Accordingly, the method comprises:

monitoring a user interaction with a system for the computer-aided creation of a digital design plan of an electrical switchgear, directed towards the creation of a digital design plan of an electrical switchgear, wherein at least one last user interaction with the system is recognized and stored in a memory of the system as user interaction data;

comparing the detected user interaction with previous identical or similar user interactions with the system for which user interaction data has been stored in the memory of the system and which have been followed by at least one further user interaction with the system for which user interaction data has been stored in the memory of the system; and outputting a list of suggestions with the at least one further user interaction on a visual display of the system.

Thus, a method is described that monitors interactions with the system for computer-aided generation of the digital design plan and infers preferred subsequent user interactions based on user interactions made. These preferred subsequent user interactions can be output to a list of suggestions so that a user has quick access to those subsequent user interactions most likely intended by the user.

In particular, if comparison of the recognized user interaction with previous identical user interactions has revealed that different subsequent user interactions exist for the previous identical user interactions that represent a possible output in the list of suggestions, weighting of the further user interaction intended for the list of suggestions can be performed according to how often one of the different subsequent user interactions actually followed the previous identical user interaction. For this purpose, corresponding weighting data can be generated and stored in the memory linked to the relevant user interaction data.

In addition, user-dependent, and therefore also personal, data can be taken into account when outputting the list of suggestions. In particular, if, as indicated in the previous example, different subsequent user interactions exist for a particular recognized user interaction, a user-dependent analysis can be performed in addition to the frequency analysis described above, alternatively or additionally thereto. For example, information about the user behavior can be stored in the database, which allows to conclude that a certain user prefers a certain subsequent user interaction to other subsequent user interactions despite several possible options for the subsequent user interaction.

In particular, if no user information about preferred user interactions is available for a specific user, the user interactions of other users or the user information about them stored in the memory of the system can be used as a basis for a preselection from several possible subsequent user interactions. It can be provided that with the use of the system an adaptation of the specific user information takes place, for example depending on recognized user-specific deviations from the average user interaction behavior of the other users, which form the treasure trove of experience for a new user.

Furthermore, it can be provided that the list of suggestions and in particular the further user interactions output therein are adapted based on specific expertise about the ECAD engineering process. For example, a database of compatible and/or incompatible user interactions may be stored in the memory of the system. For example, it may be provided that, despite a recognized user interaction, another subsequent user interaction that has already followed the recognized user interaction at least once according to the experiential knowledge of the system is not shown on the visual display of the system when the list of suggestions is output because of a technical or other incompatibility. Furthermore, in this case it can be provided that the system generates an alternative suggestion which is as close as possible to the previously excluded further user interaction, but meets the technical and possibly other requirements.

For this purpose, inventory data on planning that has already taken place and may have been qualified as successful can be analyzed and planning knowledge derived from this can be used for future planning in order to output a qualified suggestion when proposing. The suggestion can be qualified, for example, by the fact that a user interaction corresponding to the suggestion has preceded the respective preceding user interaction particularly frequently. Further, the suggested user interaction may be qualified by consisting of a plurality of individual user actions or by combining a plurality of user actions into a single user action. For example, an electrical subcircuit comprising the placement and interwiring of equal numbers of components of an electrical switchgear may be combined into a single user action issued as a qualified suggestion.

The monitoring may comprise detecting the addition of at least one electrical component of the switchgear and/or at least one processing step to the digital design plan.

The user interaction data can be stored in the memory with a time characteristic or consecutively. This enables a selection to be made according to the time characteristic for several possible further user interactions following a particular previous user interaction. This selection can be made, for example, in such a way that user interactions further in the past are weighted less than those closer in time. Accordingly, the user interactions that are closer in time can have a higher rank in the list of suggestions to be generated.

The comparing may comprise a statistical frequency evaluation of the user interaction data stored in the memory, wherein at least the further user interaction most frequently following the recognized user interaction is output on the visual display in the list of suggestions. In particular, even if there are several further user interactions, a ranking can be generated according to the frequency within which the user interactions are displayed in the list of suggestions.

The method may include capturing a user profile by capturing user interactions with the system that are uniquely associated with a unique user ID and linking the user interaction data corresponding to the user interactions to the user ID. In this way, user interaction habits can be inferred. These can be incorporated into the generation of the list of suggestions and, in particular, lead to a weighting of the further user interactions if several of these further user interactions exist, for example because several further user interactions recorded and stored in the memory of the system as user interaction data exist for a previous recognized user interaction.

User interaction data can be stored in the memory, of which at least two data sets with different user IDs are linked, whereby a weighting of the preceding identical or similar user interactions is carried out during the comparison, for which purpose user interaction data stored in the memory which have the same user ID as the user interaction data assigned to the further user interaction are assigned a higher weighting than the remaining user interaction data stored in the memory.

During monitoring, a series of successive user interactions with the system may be detected, wherein when the detected series of user interactions is compared to previous identical or similar user interactions therein, the series is recognized. In doing so, the user interaction that follows the recognized series of identical or similar user interactions may be output as the further user interaction.

For repeatedly detected user interactions, frequency data can be generated and assigned to the repeatedly detected user interaction, and the assigned frequency data is updated when the user interaction is repeated again.

From the frequency data, a hierarchy can be generated among the further user interactions that follow the same previous user interaction, and a ranking is derived from the hierarchy with which the further user interactions are output in the list of suggestions.

Outputting a list of suggestions may comprise generating and outputting a toolbar on the visual display, the toolbar comprising a visual representation of at least the further user interaction.

When output, a plurality of further user interactions may be visually represented in the toolbar, wherein an order with which the further user interactions are represented in the toolbar is derived from a frequency with which the respective further user interaction followed the detected user interaction.

It may be provided that after comparing the recognized user interaction with previous identical or similar user interactions and before outputting, a verification step is performed, wherein it is checked whether a user interaction that occurred before the recognized user interaction also preceded the previous user interaction that was recognized as identical or similar.

After comparing the recognized user interaction with a previous identical or similar user interaction and before outputting the list of suggestions, a verification step can be performed, whereby it is checked whether at least one further user interaction belongs to a set of permissible user actions or does not belong to a set of impermissible user actions. In this way, it can be avoided that inadmissible schedules are generated, in particular for technical reasons.

The incompatibility may concern an incompatibility of interconnected components when the successive user interactions are directed precisely to the interconnection of those components. For example, the incompatibility may concern an incompatibility of the interfaces of the components interconnected in the successive user interactions. Other technical incompatibility may also be excluded as part of the verification, for example, incompatibility with respect to the manufacturers of the components, the electrical power consumption of the components, the data protocol for communication between the components, and the like. Accordingly, it may be provided that at least one electrotechnical compatibility between the user interaction and the at least one further user action is checked in the verification step.

For the compatibility check, recourse may be made to compatibility data stored in a memory of the system, the compatibility data preferably having at least one electrical compatibility and/or one software compatibility and/or one mechanical compatibility of components of the electrical switchgear, towards the planning of which the user interaction and the at least one further user interaction following this are directed.

The further user interaction can be oriented to the placement on a mounting plane and/or the electrotechnical interconnection of a second component of an electrical switchgear with respect to or with a first component of the electrical switchgear placed on the mounting plane in the preceding user interaction, the further user interaction being suggested during the suggesting only if a mechanical and/or electrotechnical compatibility of the two components has been positively checked in a preceding verification step. The mounting plane can be a virtual mounting plane, which can be output above the optical display and on which the components can be placed side by side in two or three dimensions, analogous to a circuit diagram, and can be interconnected via electrical conductors.

Further areas of applicability will become apparent from the description provided herein. The description and specific examples in this summary are intended for purposes of illustration only and are not intended to limit the scope of the present disclosure.

DRAWINGS

The drawing described herein is for illustrative purposes only of selected embodiments and not all possible implementations, and are not intended to limit the scope of the present disclosure.

FIG. 1 shows in a block diagram an exemplary method for the semi-automated creation of a digital design plan of an electrical switchgear according to the teachings of this invention.

DETAILED DESCRIPTION

Example embodiments will now be described more fully with reference to the accompanying drawing.

In a first step, a plurality of user interactions A-D with the system 1 for computer-aided generation of a digital design plan of an electrical switchgear follow. These user interactions may be interactions of a user with a GUI 2 of the system 1. The user interactions may be, for example, selecting an engineering assembly, such as an electrical component, that is part of the electrical switchgear for which the digital design plan is to be generated. The user interactions may further comprise generating design data relating to mechanical processing of a component of the electrical switchgear, for example a drill hole pattern for a mounting plate. The interactions are generally not limited to any particular interactions, and are particularly intended to include those interactions that are generally known from the prior art in connection with the operation of ECAD and MCAD systems.

The user interactions of types A-D are partially represented as a cascade, i.e., they have been performed in a sequence of successive interactions by a user. According to the invention, the interactions A-D are monitored by the system 1 and user interaction data corresponding to the user interactions is stored in a memory 3 of the system 1.

An evaluation unit 4 has access to the memory 3, which on the one hand carries out the monitoring of the user interactions with the system 1 directed towards the creation of the digital design plan for the computer-aided creation of the design plan, and which on the other hand compares the user interactions detected in the process with the preceding identical or similar user interactions for which user interaction data have been stored in the memory 3. During the comparison, the evaluation unit 4 can determine at least one further user interaction with the system1, for which user interaction data has been stored in the memory 3 of the system 1, and which has followed the preceding identical or similar user interaction with the system 1.

Likewise, the evaluation unit 4 may be arranged to generate the list of suggestions 5 comprising the at least one further user interaction and output it on a visual display of the system 1, presently on the GUI 2, so that it can be selected by a user for a planned further user interaction.

Finally, a verification step 6 may be provided in which it is checked whether a user interaction "?" that occurred before the recognized user interaction 7 of type C also preceded the previous user interaction recognized as identical or similar. In the verification step 6, it can further be provided that a user-specific user model, which catalogs user interactions with the system that are typical for the user and/or relates them to each other, in particular with regard to the sequence of successive user interactions, is updated by user interactions currently performed by the user, for which purpose corresponding inventory user interaction data of the model are updated with or supplemented by new user interaction data.

For the evaluation of the user interaction 7, the user data that may have been updated in a verification step 6 may optionally be used to perform a prediction of a next user interaction with the system that is likely to be preferred by the user. This prediction may be supported by an artificial intelligence that in particular evaluates the user data.

In the also optional step 8, electrotechnical expertise can be used, on the one hand, to support the generation of the list of suggestions 5 with the evaluation unit 4 and, on the other hand, if necessary, to use the user interaction data in a step 6 to perform an update of the user-specific user model by feeding it to the evaluation unit 4.

On the other hand, the electrotechnical expertise can be used to refine the prediction of the user interaction according to electrotechnical aspects, in particular by giving lower priority to or excluding electrotechnically inappropriate or impermissible suggestions, even if they have actually already been performed in this pairing by the user when comparing the user interaction with previous user interactions.

The features of the invention disclosed in the above description, in the drawings as well as in the claims may be essential for the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A computer-implemented method for the semi-automated generation of a digital design plan of an electrical switchgear, comprising:

monitoring a user interaction with a system for the computer-aided creation of a digital design plan of an electrical switchgear, directed towards the creation of a digital design plan of an electrical switchgear, wherein at least one last user interaction with the system is recognized and stored in a memory of the system as user interaction data;

comparing the recognized user interaction with previous identical or similar user interaction with the system for which user interaction data has been stored in the memory of the system and which has been followed by at least one further user interaction with the system for which user interaction data has been stored in the memory of the system; and outputting a list of suggestions with the at least one further user interaction on a visual display of the system characterized in that after comparing the recognized user interaction with preceding identical or similar user interactions and before outputting the list of suggestions, a verification step is performed, wherein it is checked whether the at least one further user interaction belongs to a set of permissible user actions or does not belong to a set of impermissible user actions, wherein the verification step verifies at least one electrotechnical compatibility between the user interaction and the at least one further user action, wherein the compatibility check relies on compatibility data stored in a memory of the system, the compatibility data preferably comprising at least an electrical compatibility and/or a software compatibility and/or a mechanical compatibility of components of the electrical switchgear, the planning of which is targeted by the user interaction and the at least one further user interaction following it.

2. The computer-implemented method of claim 1, wherein the monitoring comprises detecting the addition of at least one electrical component of the switchgear and/or at least one processing step to the digital design plan.

3. The computer-implemented method of claim 1, wherein the user interaction data is stored in the memory with a time feature or consecutively.

4. The computer-implemented method according to claim 1, wherein the comparing comprises a statistical frequency evaluation of the user interaction data stored in the memory, wherein in the list of suggestions at least the most frequent further user interaction following the recognized user interaction is output on the visual display.

5. The computer-implemented method according to claim 1, comprising
capturing a user profile by capturing user interactions with the system uniquely associated with a unique user identifier, and associating user interaction data corresponding to the user interactions with the user identifier.

6. The computer-implemented method of claim 5, wherein user interaction data is stored in the memory, at least two records of which are associated with different user identifiers, wherein the comparison involves weighting the preceding identical or similar user interactions, for which purpose user interaction data stored in the memory having the same user identifier as the user interaction data associated with the further user interaction is assigned a higher weighting than the remaining user interaction data stored in the memory.

7. The computer-implemented method according to claim 1, wherein, in monitoring, a series of successive user interactions with the system is recognized, and wherein, in comparing the detected series of user interactions with previous identical or similar user interactions therein, the series is recognized, wherein the user interaction that follows the recognized series of identical or similar user interactions is output as the further user interaction.

8. The computer-implemented method according to claim 1, wherein frequency data is generated for repeatedly detected user interactions and associated with the repeatedly detected user interaction, wherein associated frequency data is updated upon further repetition of the user interaction.

9. The computer-implemented method of claim 8, wherein a hierarchy is generated from the frequency data among the further user interactions following the same preceding user interaction, the hierarchy being used to derive a ranking with which the further user interactions are output in the list of suggestions.

10. The computer-implemented method of claim 9, wherein, when output, a plurality of further user interactions are visually represented in the toolbar, wherein an order with which the further user interactions are represented in the toolbar is derived from a frequency with which the respective further user interaction followed the detected user interaction.

11. The computer-implemented method according to claim 1, wherein outputting a list of suggestions comprises generating and outputting a toolbar on the visual display, the toolbar comprising a visual representation of at least the further user interaction.

12. The computer-implemented method according to claim 1, wherein after comparing the recognized user interaction with previous identical or similar user interactions and before outputting the list of suggestions, a verification step is performed, wherein it is checked whether a user interaction that occurred before the recognized user interaction also preceded the previous user interaction recognized as identical or similar.

13. The computer-implemented method of claim 1, wherein the compatibility check relies on compatibility data stored in a memory of the system, wherein the compatibility data preferably comprises at least one electrical compatibility and/or one mechanical compatibility of components of the electrical switchgear, the planning of which is targeted by the user interactions and the at least one further user interaction.

14. The computer-implemented method according to claim 1, wherein the further user interaction is directed to placing on a mounting plane and/or electrotechnically interconnecting a second component of an electrical switchgear with respect to or with a first component of the electrical switchgear placed on the mounting plane in the preceding user interaction, wherein the further user interaction is suggested in the suggesting step only if a mechanical and/or electrotechnical compatibility of the two components has been positively verified in a preceding verification step.

* * * * *